US007800373B2

(12) United States Patent  
Cuevas et al.

(10) Patent No.: US 7,800,373 B2
(45) Date of Patent: Sep. 21, 2010

(54) METHOD FOR CORRECTING MAGNETIC BASED ORIENTATION MEASUREMENTS FOR LOCAL BIASING FIELDS

(75) Inventors: Nestor Cuevas, Albany, CA (US); Edward Nichols, Berkeley, CA (US)

(73) Assignee: WesternGeco L.L.C., Houston, TX (US)

( * ) Notice: Subject to any disclaimer, the term of this patent is extended or adjusted under 35 U.S.C. 154(b) by 1 day.

(21) Appl. No.: 11/943,247

(22) Filed: Nov. 20, 2007

(65) Prior Publication Data

US 2009/0128138 A1    May 21, 2009

(51) Int. Cl.
*G01V 3/08* (2006.01)
*G01V 3/15* (2006.01)
(52) U.S. Cl. .................. 324/350; 324/348; 324/365
(58) Field of Classification Search .................. 324/323, 324/353, 347–350, 365

See application file for complete search history.

(56) References Cited

U.S. PATENT DOCUMENTS 5,770,945 A      6/1998   Constable
7,295,013 B2 *  11/2007   Conti et al. .................. 324/350

* cited by examiner

*Primary Examiner*—Reena Aurora

(57) ABSTRACT

A method of determining an orientation of a data acquisition system deployed on a seafloor includes measuring horizontal magnetic fields using detectors on the data acquisition system while the data acquisition rotates and descends to the seafloor or rises from the seafloor. Resting horizontal magnetic fields are measured after the data acquisition system is on the seafloor. A heading of the data acquisition system on the seafloor may be determined based on maximum and minimum horizontal magnetic fields measured during the descent and the resting horizontal magnetic fields.

12 Claims, 3 Drawing Sheets

METHOD FOR CORRECTING MAGNETIC BASED ORIENTATION MEASUREMENTS FOR LOCAL BIASING FIELDS

BACKGROUND OF INVENTION

1. Field of the Invention

The invention relates generally to seafloor magnetic measurements, and, more particularly to a method and system for correcting magnetic based orientation measurements.

2. Background Art

The present invention is particularly related to remotely operable electromagnetic (EM) measurement systems, such as Magnetotelluric (MT) or controlled source electromagnetic (CSEM) measurement systems. Both MT and CSEM use similar receiver setups. They differ in the sources of EM energies used in the surveys. MT uses natural EM perturbation induced in the formation. CSEM uses a controlled EM source that is towed by a ship, typically at about 50 feet from the seafloor, where the receiver arrays are placed. Because the receivers used for MT and CSEM share similar properties, the following description will focus on MT measurement. However, one of ordinary skill in the art will appreciate that the description is equally applicable to CSEM measurements, or other EM measurement techniques such as IP, TDEM or hybrid seismoelectric techniques.

MT measurements are used to compute an EM impedance of selected earth formations. MT measurements are especially useful in regions where seismic imaging is inappropriate. For example, MT exploration is useful when evaluating geologic formations such as salts and carbonates. Salts, carbonates, and other particular formations may scatter seismic energy when seismic energy is propagated through them because of large velocity contrasts and inhomogeneties located within these formations, whereas the EM energy of the MT source fields propagates through these layers with less distortion. MT methods measure variations in the earth's magnetic and electric fields, and do not rely on seismic energy to determine formation characteristics.

MT methods may be used to measure an EM impedance as a function of frequency. Lower frequency provides a greater depth of penetration. The measured impedance may be transformed into an apparent resistivity and/or conductivity of the selected formations. Measuring impedance at several locations at various frequencies enables a determination of resistivity and/or conductivity as a function of both depth and horizontal position. Therefore, MT methods may be used to evaluate formation resistivity over large areas of the seafloor. The formation resistivities of the various formations in a selected area may then be analyzed to determine the formation geometry, the presence or absence of hydrocarbons in selected formations, and the like.

MT methods are passive methods, in that MT methods use natural variations in the earth's magnetic field as an energy source. Such methods include a subsea system that detects orthogonal magnetic and electric fields proximate the seafloor to define a surface impedance. The surface impedance, as described above, may be measured over a broad range of frequencies and over a large area where layered formations act in a manner analogous to segments of an electrical transmission line. One MT method that operates according to the principles described above is generally disclosed in U.S. Pat. No. 5,770,945 issued to Constable. The type of EM receiver disclosed therein can also be used to record EM signals that originate from various kinds of transmitter systems, such as a towed cable bipole or magnetic loop source.

In addition, the receivers could be used to detect EM radiation originating from other types of signals such as emanating from naval ships (corrosion currents, electric circuits, generators, moving machinery) or from electric or magnetic sources located in boreholes or nearly land sources. The objective of these measurements could range from detailed exploration of the subsurface conductivity structure to monitoring naval traffic or operations to determining leakage signals from subsea cables.

Referring to FIG. 1, a subsea system that may be used in MT methods includes an apparatus such as an MT measurement system 100 disclosed in the Constable patent. The MT measurement system 100 includes a body 102 having a battery pack (not shown), a data acquisition system 104, two orthogonally oriented magnetic sensors 122 and 124, and four arms 139, 140, 142, and 144, each of which includes an electrode 118, 119, 120, 121 mounted at the end thereof. The electrodes 118, 119, 120, 121 are silver-silver chloride electrodes, and the magnetic sensors 122, 124 are magnetic induction coil sensors.

The arms 139, 140, 142, 144 are five meters long and approximately 2 inches in diameter. The arms 139, 140, 142, 144 may be formed from a semi-rigid plastic material (e.g., polyvinyl chloride or polypropylene) and are fixed to the body. The arms 139, 140, 142, 144 are designed to rest on the seafloor when the MT system 100 is deployed.

The body 102 is attached to a releasable concrete anchor 128 that enables the MT system 100 sink to the seafloor after deployment. The body 102 generally rests on top of the anchor 128 when it is positioned on the seafloor. The anchor 128 may be released after MT measurements have been completed so that the body 102 may rise to the surface and be retrieved by a surface vessel (not shown).

In seafloor EM measurements, the three-dimensional (3D) orientation of the sensors is determined from independent measurements of the static magnetic field of the Earth H and measurements of the acceleration of gravity, g. An orientation measurement instrument uses a magneto-resistive device, fluxgate magnetometer, or DC magnetometer to measure the three components of the magnetic field and a three-component tilt meter to measure g. Alignment on the horizontal plane (heading) is obtained from the measure of the horizontal components of H, while the pitch and roll angles are obtained from measurements of g. Note the dip could alternatively be determined by directly reading a tiltmeter device such as a pendulum or electrolytic bubble tiltmeter.

The measurement of the Earth's static magnetic field may be biased due to the presence of locally originated magnetic fields. Sources of locally originated magnetic fields may include induction sensors having highly permeable cores, remnant magnetic fields in the steel casing surrounding a battery, acoustic transducers, and fields arising from current flow within the electronics. As a result of locally originated magnetic fields, the total magnetic field measurement is a superposition of the Earth's static magnetic field with the biasing fields arising from local sources. The effect of the biasing fields cannot be uniquely calibrated for a given data acquisition system because the biasing fields change with each deployment from modifications to the MT measurement system, including a new battery, induction sensors in a different position, or any other changes involving ferrous metal or electricity. Thus, calibration is required for each deployment of a MT measurement system.

In the related art, there are several calibration/orientation techniques. One technique is known as a sugar cube compass. In this technique, a compass needle floats on a solution that freezes at low temperatures. When the solution freezes, the compass needle is locked at the orientation of the sensors. Local magnetic sources can bias the compass reading. In some instances, the freezing point of the solution may not be reached at the seafloor, keeping the compass needle from being locked in place.

Another related art calibration/orientation technique is data correlation with natural fields. Recorded EM data is correlated with data acquired at a reference site of known orientation. For example, the reference site may be on land. This technique is supported by the fact that plane wave natural fields are assumed homogeneous across both the land reference and seafloor deployments of the data acquisition system. Accuracy of the technique depends largely on data quality and may be unable to be used if one of the horizontal magnetic field measurements is missing, or distorted by subsurface structures.

Another related art calibration/orientation technique is data correlation with controlled source fields. In controlled source EM surveys, a transmitter antenna supplies a signal to be analyzed. The orientation of the transmitter antenna is assumed to be known, and then the data can be rotated to maximize the amplitude at the closest position of the transmitter. This technique relies on exact knowledge of the transmitter antenna position and orientation which change as a transmitter dipole is towed.

SUMMARY

In one aspect, the present disclosure relates to a method of determining an orientation of a data acquisition system deployed on a seafloor. The method includes measuring horizontal magnetic fields using detectors on the data acquisition system while the data acquisition system rotates and descends to or ascends from the seafloor, measuring resting horizontal magnetic fields while the data acquisition system is on the seafloor, and determining a heading of the data acquisition system on the seafloor based on calibration parameters determined during the descent, ascent or while the system rotates on the sea surface, and using these parameters to determine the undistorted horizontal magnetic field values, which are then used to determine the acquisition systems's orientation.

In another aspect, the present disclosure relates to a data acquisition system that includes an orientation measurement instrument configured to measure a horizontal magnetic field and means for causing the rotation of the data acquisition system about a vertical axis during a descent to a seafloor or ascent from the seafloor, or while the system is rotating in the surface swell.

Other aspects and advantages of the invention will be apparent from the following description and the appended claims.

BRIEF DESCRIPTION OF DRAWINGS

FIG. 3 shows an example electrode mount for rotating a data acquisition system.

DETAILED DESCRIPTION

The present disclosure relates to methods and apparatuses for calibrating or determining orientations of EM receivers (or data acquisition systems) deployed on the seafloor. In one example, a method for determining the orientation of an EM measurement system includes allowing the receiver to rotate about its vertical axis while measuring a horizontal magnetic field. The rotation of the receiver or data acquisition system may occur during a descent to the seafloor. The measurements taken during rotation may be used to determine a calibration parameter for the orientation measurement instrument. In particular, the calibration parameter(s) may be determined from an average maximum and/or minimum horizontal magnetic field measured during multiple rotations of the data acquisition system. Alternatively, one notes that all of the magnetic measurements fall on the surface of an ellipsoid where the axis lengths are the calibration values for each magnetometer component, and the centroid corresponds to the DC offset for each magnetometer component. A least squares fitting technique could be used to recover these calibration parameters from a set of measurements taken while the acquisition system changes it's orientation. This analysis could be further expanded to account for non orthogonality of the magnetometer axis so that the initial axis directions are also solved for in the least squares fitting procedure.

Figure 1:
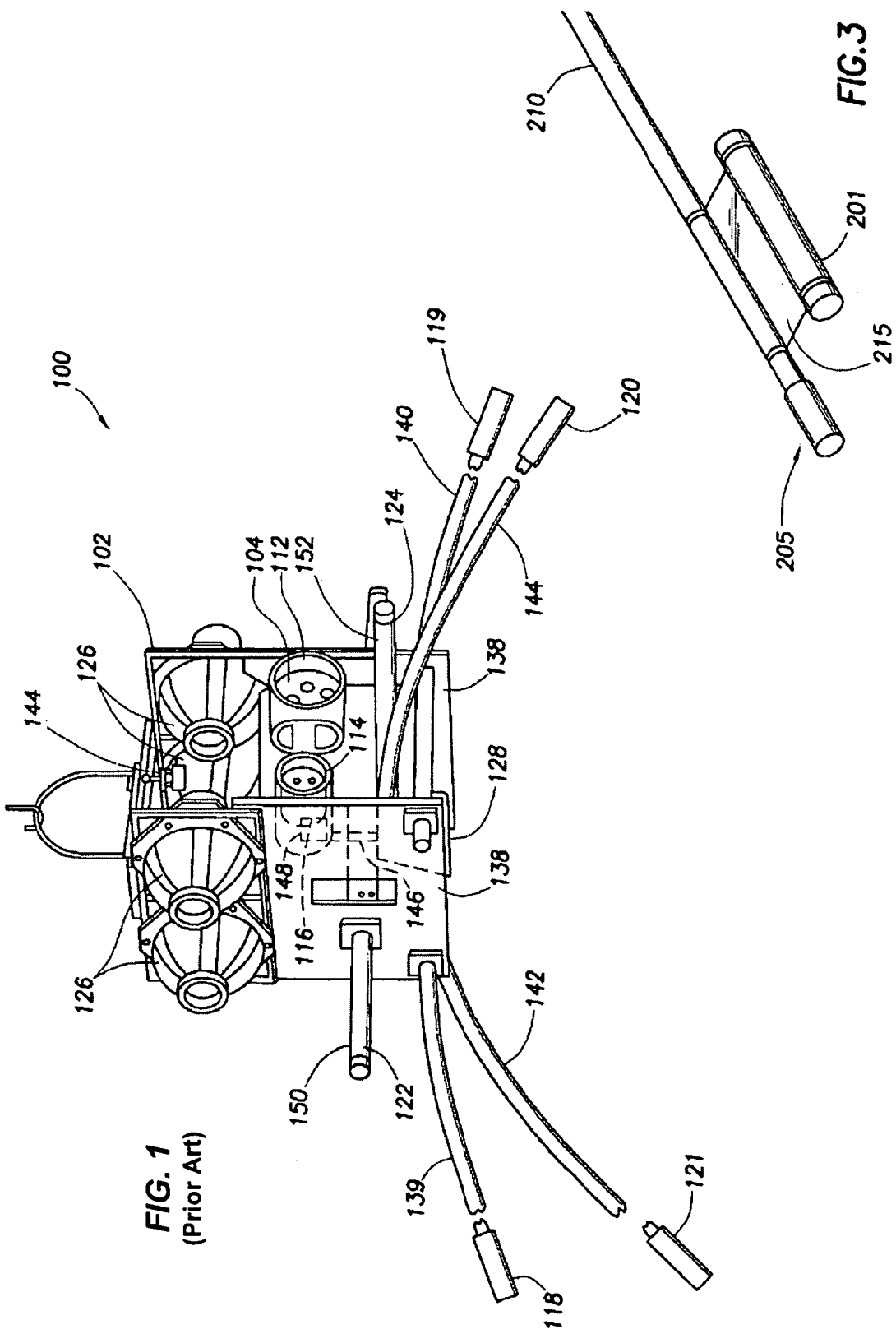
FIG. 1 shows a prior art EM measurement system.
Figure 2:
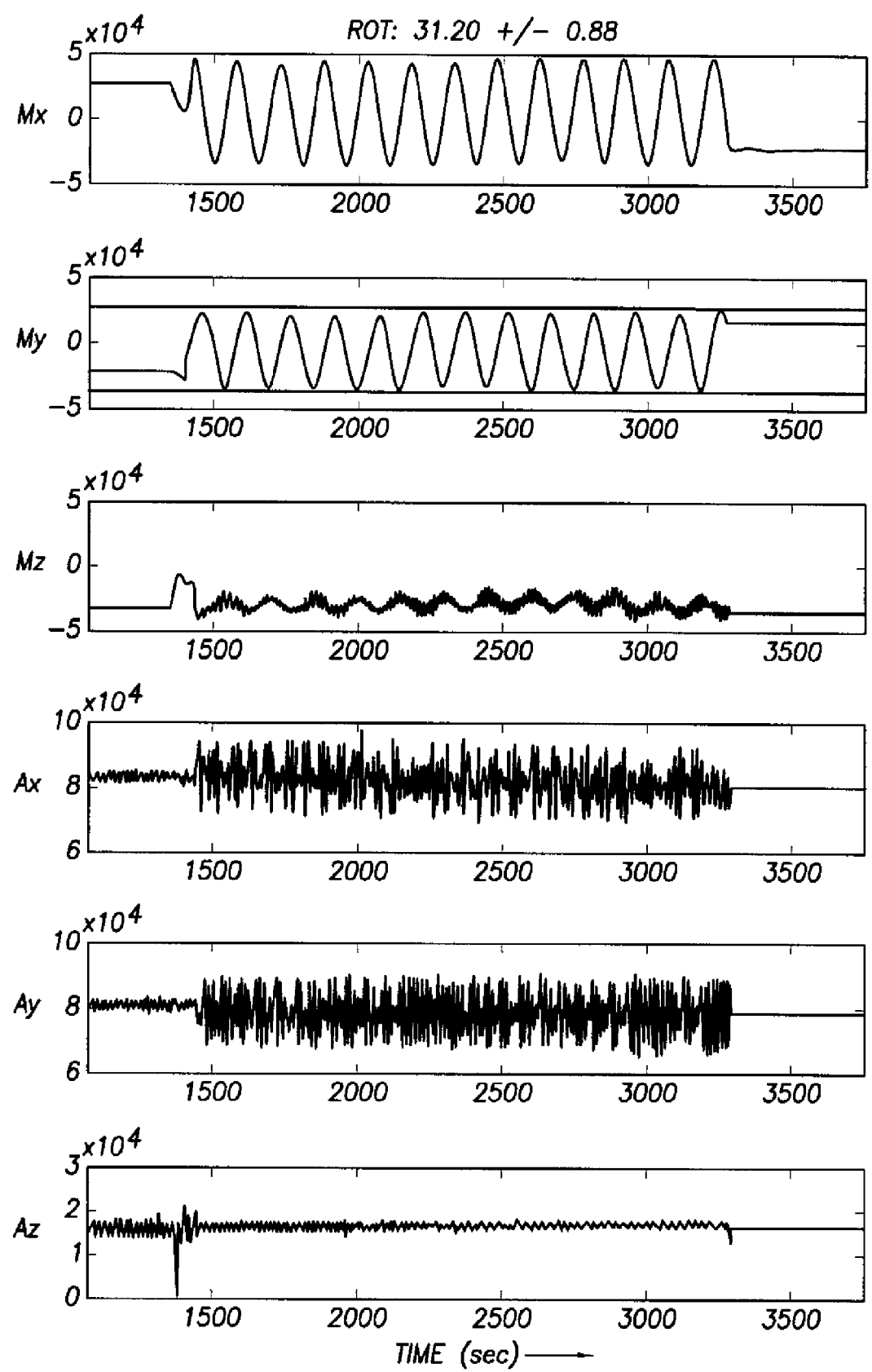
FIG. 2 shows an example of data obtained during rotation of a data acquisition system.
Figure 4A:
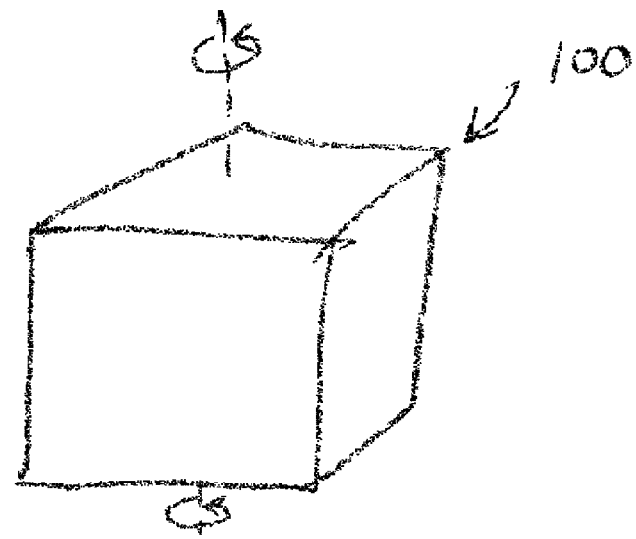
FIGS. 4A-4B illustrate rotation of a data acquisition system.
Figure 4B:
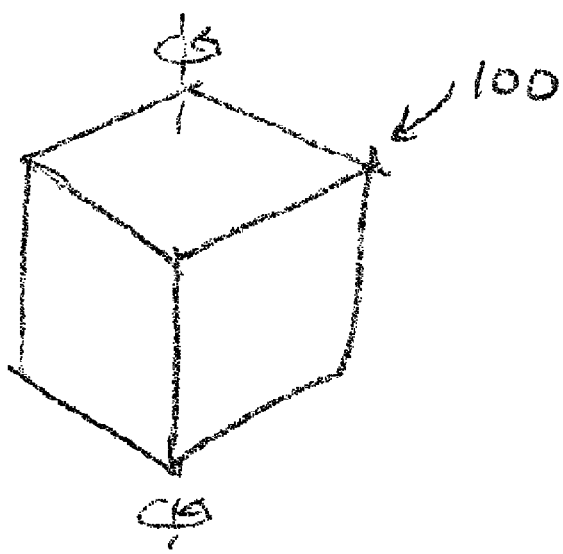

FIG. 2 shows a sample record of measurements taken during the rotation of the data acquisition system. In this example, as shown in FIGS. 4A-4B, the data acquisition system is rotated during descent (about its vertical axis) until landing on the seafloor at 1500 m depth while continuously performing measurements of the magnetic field. A full rotation of the data acquisition occurred about 125 seconds during the descent, as shown by the measurements of the horizontal magnetic field (Mx and My). Those having ordinary skill in the art will appreciate that the rate of rotation may vary without departing from the scope of the invention. Each maximum of Mx and My represents the corresponding magneto-resistive device pointing north. Each minimum of Mx and My represents the corresponding magneto-resistive device pointing south. By taking the maximum and minimum of Mx and My across multiple rotations, the averages can be obtained.

The measurement of a component of the magnetic field by a magneto-resistive device is determined to first order as: $M=A+B*H$, wherein H is the static Earth's magnetic field along a given direction, M is the measurement of the magneto-resistive device in volts, and A, B are offset and gain calibration (V/nT) parameters. The calibration parameters A, B are due to the intrinsic characteristics of the magneto-resistive device and the external bias imposed by the presence of magnetic field sources mounted on the data acquisition system. From the average maximum and minimum values of Mx ($Max_x$ and $Min_x$) and My ($Max_y$ and $Min_y$) during rotation, the calibration parameters can be indirectly determined and used to determine the magnetic field strength at a position on the seafloor from the following equations.

$$Hx\alpha[2*Mx-(Max-Min)_x]/(Min-Max)_x$$

$$Hy\alpha[2*My-(Max-Min)_y]/(Min-Max)_y$$

Using the above calculated values of Hx and Hy, the heading angle θ can be estimated from the following equation.

$$\theta=tg^{-1}(Hy/Hx)$$

Using the example data relating to FIG. 2, the above equations are used to determine the heading angle θ of the data acquisition system. In the graphs of Mx and My, the stable value following the periodic oscillation represents the end of the rotation of the data acquisition system, meaning that the data acquisition system has come to rest on the seafloor. Combining the measurement of Mx and My after landing on the seafloor with the average maximum and minimum values of Mx and My during rotation, as shown in the above equations, results in an estimated heading angle θ of 31.2 degrees+/−0.88 degrees, where the deviation is calculated by looking at the deviation of the maximum and minimum averages. Alternatively, as discussed above, the measured values (not average maximum and minimum values) lie on an ellipsoid so that a more general fitting function may be used for calibration.

FIG. 3 shows an example of an electrode mount 215 that can be used to impart a rotational force on the data acquisition system. In FIG. 3, the electrode 201 is attached to the dipole arm 210 extending from the data acquisition system. The electrode 201 is mounted near the free end 205 of the dipole arm 210. To impart the rotational force during descent, the electrode mount 215 may be angled on the dipole arm 210 with respect to the vertical axis of the data acquisition system. For example, the electrode mount 215 may be mounted at a 45 degree angle, although in other examples, the electrode mount 215 may be mounted at a non-orthogonal angle and a least squares fitting may be applied to correct for any misalignment of the sensors—the angle of the mounting is secondary as long as after calibration, the acquisition system alignment can be determined. Electrode mounts on the other dipole arms may be similarly mounted such that each dipole arm imparts a rotational force in the same direction (clockwise or counterclockwise) as the data acquisition descends towards the seafloor. This same mounting would also suffice to impart an opposite sense rotation as the acquisition system was ascending from the sea floor. The size and angle of the electrode mounts and the length of the dipole arms will in large part determine the rotation speed of the data acquisition system during descent and ascent. In one example, the rotation speed may be about one rotation per minute. Those having ordinary skill in the art will appreciate that the invention is not limited to any particular rotation speed of the data acquisition system.

Those having ordinary skill in the art will appreciate that the data acquisition system may be rotated during descent using a variety of techniques without departing from the scope of the invention. For example, separate blades may be provided on the data acquisition system to act as a propeller. In another example, the dipole arms may be elliptical and oriented on the data acquisition system to function as a propeller.

While the invention has been described with respect to a limited number of examples, those skilled in the art, having benefit of this disclosure, will appreciate that other examples can be devised which do not depart from the scope of the invention as disclosed herein. Accordingly, the scope of the invention should be limited only by the attached claims.

What is claimed is:

1. A method of determining an orientation of a data acquisition system deployed in a marine environment, comprising:
    measuring horizontal magnetic fields using detectors on the data acquisition system while the data acquisition system rotates in the water;
    measuring horizontal magnetic fields when the data acquisition system is on a seafloor; and
    determining a heading of the data acquisition system on the seafloor based on maximum and minimum horizontal magnetic fields measured while the data acquisition system rotates and the horizontal magnetic fields measured when the data acquisition system is on the seafloor.

2. The method according to claim 1, wherein a rate of rotation is substantially constant.

3. The method according to claim 1, wherein the maximum and minimum horizontal magnetic fields used for the determining are averages from a plurality of complete rotations of the data acquisition system.

4. The method according to claim 1, further comprising:
    determining a calibration parameter comprising an offset and a gain for a magneto-resistive device of the data acquisition system based on the heading.

5. The method according to claim 4, further comprising:
    calibrating the magneto-resistive device with the offset and the gain.

6. The method according to claim 1, wherein the measuring the horizontal magnetic fields during rotation is substantially continuous.

7. A method of determining an orientation of a data acquisition system deployed on a seafloor, comprising:
    measuring horizontal magnetic fields using detectors on the data acquisition system while the data acquisition system rotates in the water;
    measuring horizontal magnetic fields when the data acquisition system is on the seafloor; and
    determining a heading of the data acquisition system on the seafloor based on the horizontal magnetic fields measured while the data acquisition system rotates and the horizontal magnetic fields measured when the data acquisition system is on the seafloor by applying a general fitting function.

8. The method according to claim 7, wherein a rate of rotation is substantially constant.

9. The method according to claim 7, wherein the measured horizontal magnetic fields used for the determining lie substantially along an ellipsoid having axis lengths of one or more calibration values for each magnetic field component, and a centroid corresponding to a DC offset for each magnetic field component.

10. The method according to claim 7, further comprising:
    determining a calibration parameter comprising an offset and a gain for a magneto-resistive device of the data acquisition system based on the heading.

11. The method according to claim 10, further comprising:
    calibrating the magneto-resistive device with the offset and the gain.

12. The method according to claim 7, wherein the measuring the horizontal magnetic fields during rotation is substantially continuous.

* * * * *